United States Patent [19]

Costa

[11] Patent Number: 4,801,003
[45] Date of Patent: Jan. 31, 1989

[54] CONVEYOR AND DEVICES FOR CONVEYING MOVABLE PLANES ON AUTOMATIC DISTRIBUTION LINES SHOWING A PLAN PREFERABLY QUADRANGULAR

[76] Inventor: Alessandro Costa, Via Brolo del Conte, 10 - Schio (Vicenza), Italy

[21] Appl. No.: 114,124

[22] Filed: Oct. 28, 1987

[30] Foreign Application Priority Data

Nov. 5, 1986 [IT] Italy .............................. 63355B/86[U]
Aug. 27, 1987 [IT] Italy .............................. 63294B/87[U]

[51] Int. Cl.$^4$ ............................................ B65G 15/00
[52] U.S. Cl. ..................................... 198/802; 198/728; 198/465.2; 198/803.6; 198/805; 104/172.1
[58] Field of Search ......................... 186/42, 44, 45, 46, 186/49; 198/619, 990.1, 805, 802, 717, 722, 723, 725, 727, 728, 729, 730, 732, 733, 734, 735, 803.01, 803.6, 465.1, 465.2; 104/165, 172.1, 172.3

[56] References Cited

U.S. PATENT DOCUMENTS

| | | | |
|---|---|---|---|
| 2,144,835 | 1/1939 | Dickinson | 198/619 X |
| 2,611,473 | 9/1952 | Reynolds | 198/803.01 |
| 3,474,892 | 10/1969 | Spodig | 198/619 |
| 3,926,489 | 12/1975 | Futch | 198/803.01 X |
| 4,540,326 | 9/1985 | Southworth et al. | 104/165 X |
| 4,718,349 | 1/1988 | Wahren | 198/803.01 X |

FOREIGN PATENT DOCUMENTS

| | | |
|---|---|---|
| 0043399 | 1/1982 | European Pat. Off. . |
| 1958177 | 5/1971 | Fed. Rep. of Germany . |
| 2144577 | 2/1973 | France . |
| 0655609 | 4/1979 | U.S.S.R. . |
| 1180292 | 2/1970 | United Kingdom . |

*Primary Examiner*—Frank E. Werner
*Assistant Examiner*—Lyle K. Kimms
*Attorney, Agent, or Firm*—Angelo Notaro

[57] ABSTRACT

The present invention consists in employing conveyors and/or pushers in order to permit movable planes (7,110) to be advanced along bearing guides (1, 102) showing a quadrilateral shape. The advancing motion of the movable planes (7, 110) is caused by several devices which are housed in seats, suitably profiled, of the guides (1, 102). These devices are mounted on a peripheral chain line (3, 104). According to a first embodiment, the aforesaid devices are provided with a series of small bars (5) which are mounted on the chain (3) and supports magnetic elements (4) dragging metallic discs (6) applied under sliding planes (7). According to a second embodiment, the chain line (104) supports a series of plates (106) which are provided with pushers (108) working in contrast with a spring and pushing vertical stirrups (111) which are provided under the sliding planes (110).

6 Claims, 3 Drawing Sheets

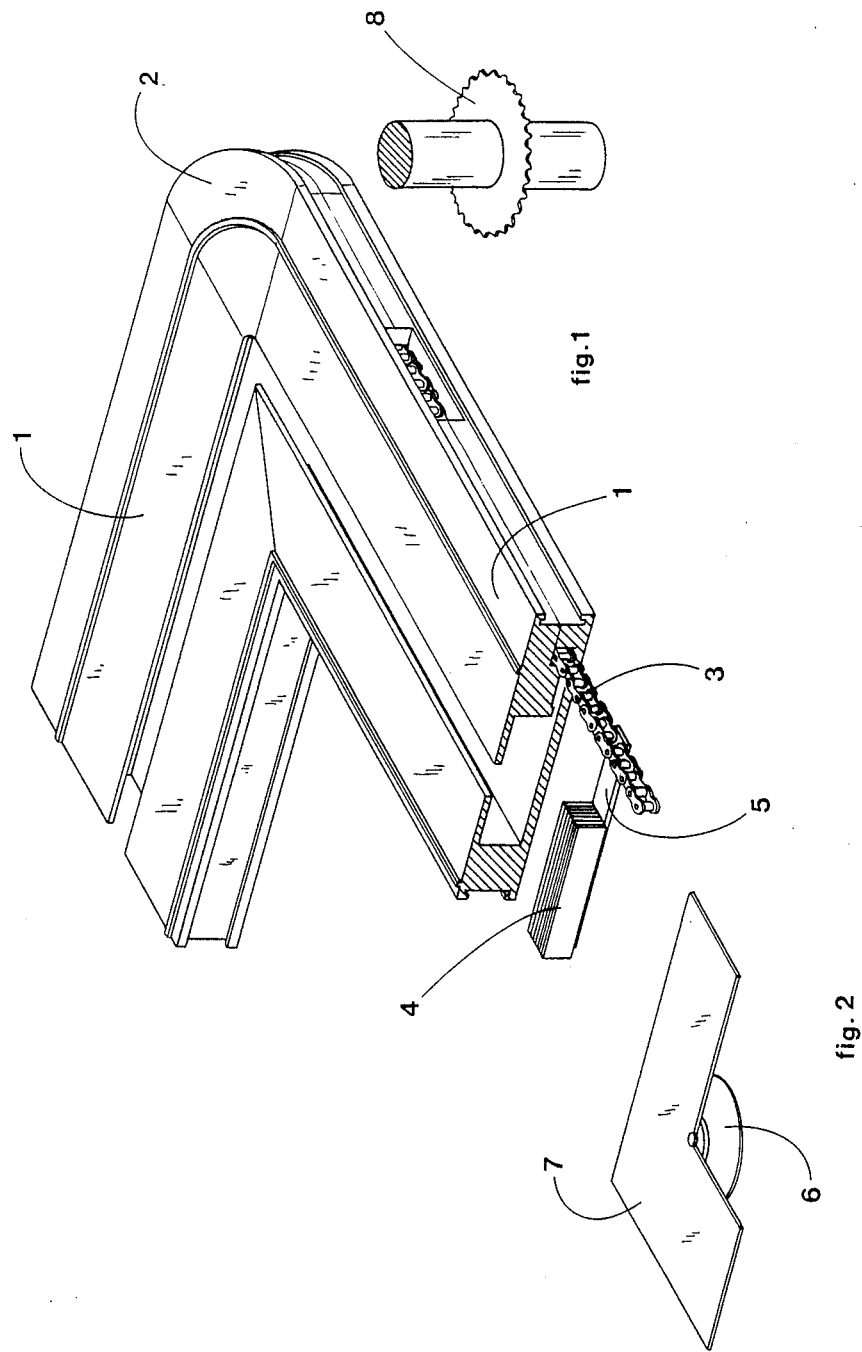

CONVEYOR AND DEVICES FOR CONVEYING MOVABLE PLANES ON AUTOMATIC DISTRIBUTION LINES SHOWING A PLAN PREFERABLY QUADRANGULAR

FIELD AND BACKGROUND OF THE INVENTION

The present patent of invention relates to a conveyor provided with devices which permit movable planes to be conveyed on automatic distribution lines having a plan which is preferably quadrangular.

The purpose of the present invention is to solve some problems concerning the automatic distribution made, for instance, in self-services or snack bars, where trays or mobile planes, bearing the products to be distributed, slide on slideways.

In the last years, the art tended towards the production of distributors for automatically conveying trays, in order to make filling and emptying operations for the products easier.

At the present time there are some models of this kind of distributors, however for moving forward trays or planes supporting the products to be distributed, it is necessary to limit the types of sliding ways, for instance to rounded sliding ways, or roundabout sliding ways.

The automatic distributors such as those with roundabout sliding ways, present the inconvenience of not permitting the users to employ all the surface, in fact circular spaces remain unemployed among the trays. For this reason the capacity of containment of the slideway is reduced.

Another difficulty consists in moving forward every tray or mobile plane in the slideway, in fact there are obstacles and hindrances on doing so.

SUMMARY OF THE INVENTION

These disadvantages and further ones are eliminated by the present invention which proposes an automatic distribution line having a plan which is preferably quadrangular, with very simple, functional devices for conveying movable trays or planes for bearing the products to be distributed.

In fact the invention refers to a conveyor for products to be automatically distributed, characterized in that for presenting supporting guides consisting of straight components connected with angular components, all these components forming a structure essentially quadrilateral; the supporting guides are provided with seats, suitably profiled, for containing a peripheral chain line with vertical links; devices for permitting the movable planes to be advanced are arranged in the chain line.

BRIEF DESCRIPTION OF THE DRAWINGS

The invention will be better understood by means of the following specification, set forth as an example not restricting the invention, as well as by means of the accompanying drawings in which:

FIG. 1 shows a schematical, perspective, sectional view of a detail of a guide of the distributing line, with advancing devices carried out according to a first embodiment;

FIG. 2 shows a view of a sliding plate, provided with a lower dragging disc according to the embodiment of FIG. 1;

DESCRIPTION OF THE PREFERRED EMBODIMENTS

Figure 3:
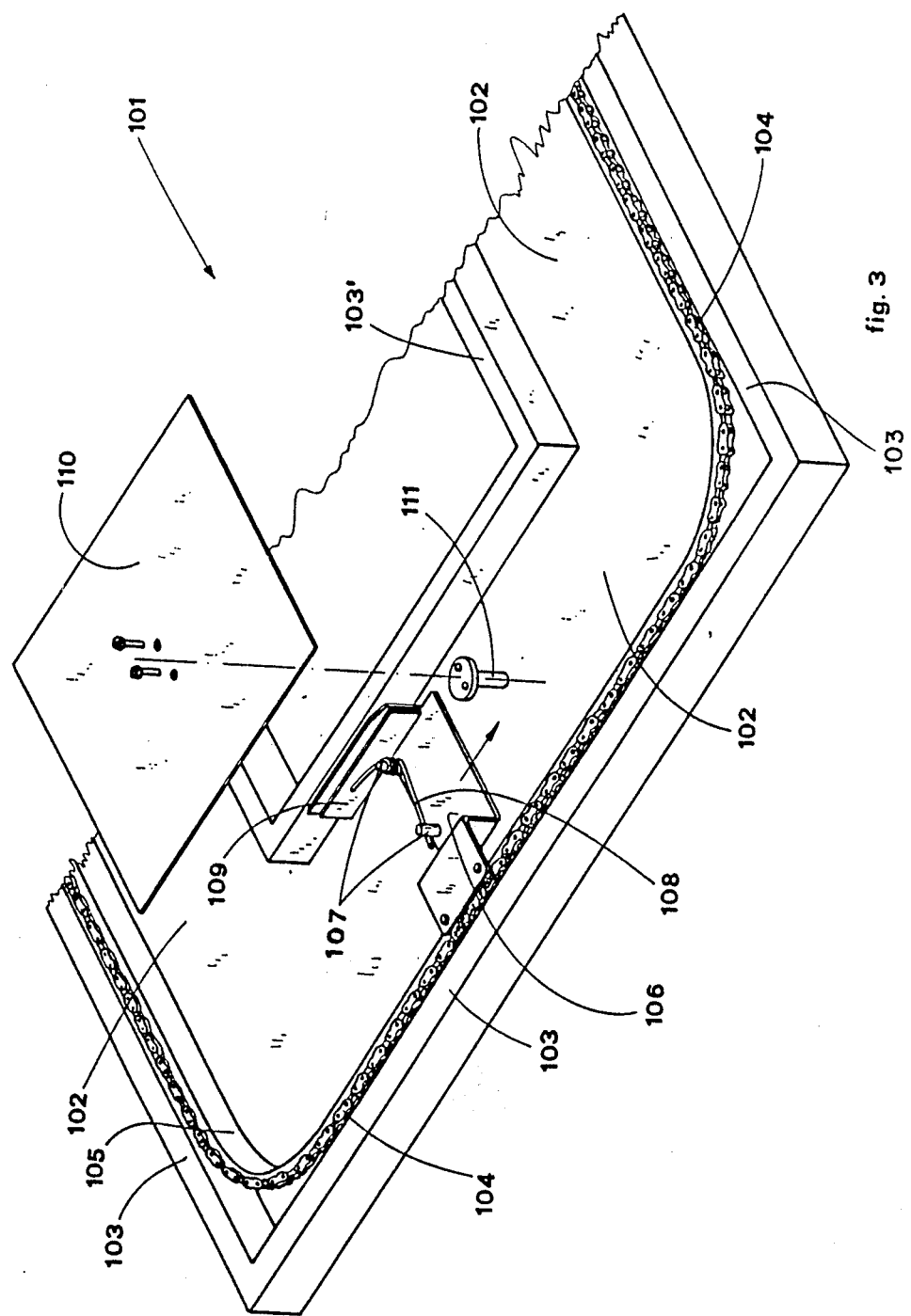
FIG. 3 shows a schematical perspective view of a distributing line according to a further embodiment.

With reference to FIGS. 1 and 2 illustrating the first embodiment, number 1 denotes a straight component of a bearing guide. The straight component 1 is formed with extruded profiles, and is made, for instance, of PVC. On the other hand, number 2 denotes an angular connecting component or "curve", which is obtained for instance through pressing. Accordingly, it is possible to produce a quadrilateral line by using components 1 and 2.

The straight components, seen sectionally in the figure 1, show a particular profile extending along the whole length of the line. This profile has seats for respective ly housing a chain 3 with vertical chain links, and a series of magnetic elements 4, preferably parallelepiped-shaped. The magnetic elements 4 are connected through small bars 5 to the chain 3, at regular intervals. The upper surface of the straight components 1 shows a groove communicating with the seat for the magnetic elements 4, in which seat dragging metallic discs 6 slide. The metallic discs 6 are arranged under bearing planes 7.

The chain 3 is set in motion by means of a conventional pinion 8 engaging the chain itself. The chain 3, in its turn, sets the magnetic elements 4 in motion through the small bars 5, which always remain orthogonal to the chain 3. As a consequence of this, the discs 6, which have been prearranged with their respective planes 7 over the magnetic elements 4, are dragged along the whole line.

When the magnetic elements 4 and the small bars 5 reach the angular components 2, they effect a turn of 90°, the middle of the circular sector being the middle of the magnetic elements. The covered arc corresponds to the shifting of the chain around its own seat. In this manner, the spaces between two adjacent planes 7 are annulled and there is a continuity in the movable support along the whole line.

Figure 4:
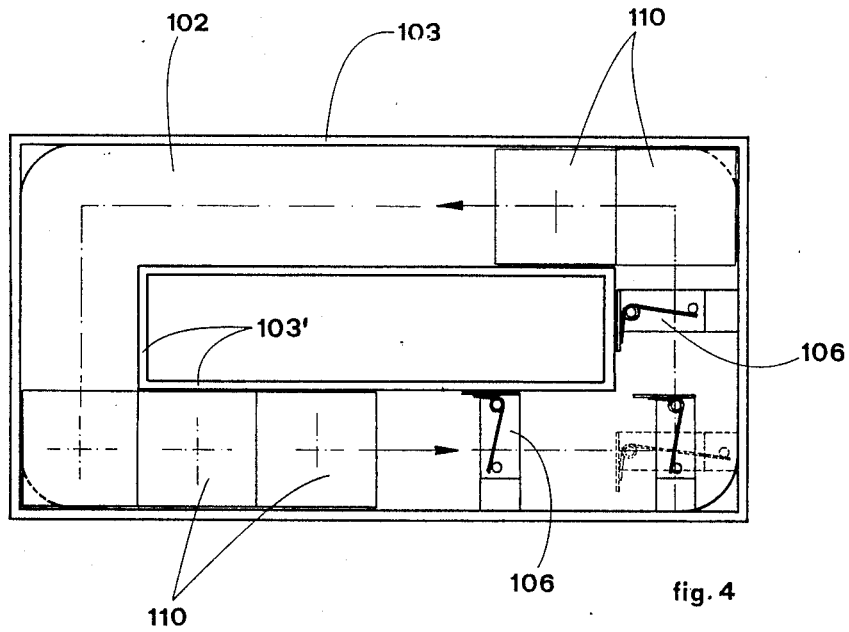
FIG. 4 shows a schematical view illustrating the movements of the thrusting plates and of the movable sliding planes according to the second embodiment of FIG. 3.
Figure 5:
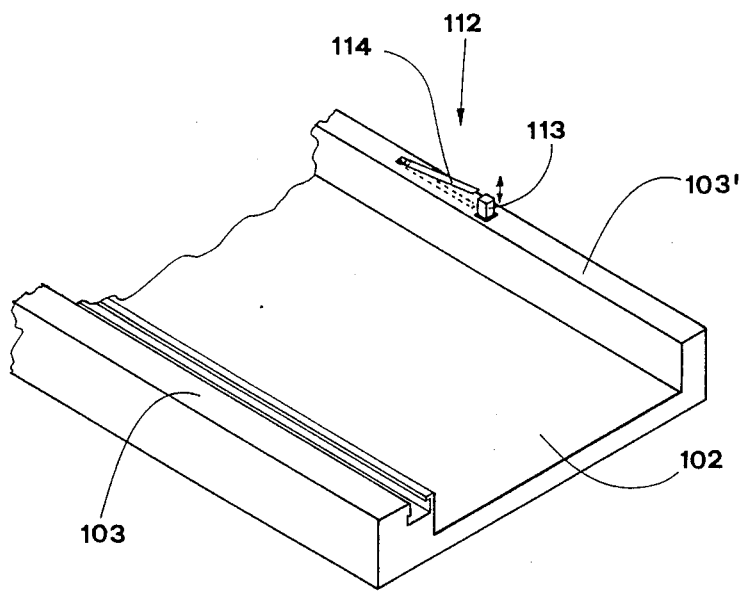
FIG. 5 shows a schematical perspective view of a distributing guide with stops for the movable planes.

With reference to FIGS. 3, 4 and 5, a second embodiment of the invention will be described now. Number 101 denotes a distributor for products such as food, drinks, and the like. The distributor 101 essentially consists of guides 102 arranged along four orthogonal sides.

The inner part of a peripheral border 103 is passed by a continuous chain line 104, kept internally by means of a batten 105.

The chain 104 is set in motion through conventional operating means such as a toothed wheel. Particular movable plates 106, which slide on the guides, are joined to the chain links, at regular intervals. Each movable plate 106 is provided with a pair of vertical pins 107. A spring pusher 108 is arranged on and between the vertical pins 107. The spring pusher 108 works in contrast with a bottom face 109, which is attached to the movable plate 106 itself.

The chain 104 and the plates 106 convey a series of movable planes 110, substantially square, on which planes the products to be distributed are laid. A vertical stirrup 111 is mounted on the lower side of each plane 110. The plane 110 with the relative stirrup 111 is intercepted and pushed along the guides 102 by the pusher 108 of the plate 106.

The movement of the plane 110 and relative pushing parts will now be described shortly.

The chain 104 moves along its guides with a uniform motion and with a predetermined speed. When the chain 104 moves, the plates 106 too are set in motion. The stirrup 111 of each plane 110 is intercepted by the spring pusher 108, which conveys the plane 110 itself along the guides 102.

When the plane 110 reaches an angular part, close to the border 103 of the following guide, the plate 106 makes an arc the middle of which corresponds approximately to the stirrup 111.

The plate 106 effects a rotation of about 90° and then moves forward in the following guide. Therefore the pusher 108 makes the plane 110 move in a new direction orthogonal with respect to the previous direction. Accordingly the plane 110 always keeps the same angular position with regard to the guides and is conveyed along the guides with directions always orthogonal to each other.

In the FIG. 3, for the sake of lucidity, only a plane 110 with its relative pushing device is represented. In practice, the arrangement of the plates 106, which are regularly spaced along the chain 104, permits all the planes to be conveyed side by side.

Moreover, the pushers 108 push the stirrups 111 with a space tolerance, especially in the angular parts of the guides 102. The springs of the pushers 108 are calibrated in order to support a pushing stress within quite precise limits over which the pushers 108 spring up idling. In this manner, the chain 104 and relative pushers 108 keep on moving forward even if the planes 110 have stopped, for instance owing to the clogging of one of them. Therefore it is avoided that the mobile planes 110 heap one upon another. As an advantage, an inner border 103' (see FIGS. 4 and 5) of the guides 102 may be provided with a stopping device, indicated as a whole with number 112. The stopping device 112 comprehends a retractable tooth 113 which may be lifted or lowered automatically in order to stop or not the motion of the mobile planes 110. A small tongue 114 intercepts the passage of a plane 110 and has the tooth 113 got out from its seat, so that the plane 110 stops and the user can take the product. Then the line, momentary stopped, may start again by imparting a new movement.

In both embodiments of the invention, a quadrilateral guideway is formed by straight components 1 or 102, which are connected to each other by angular components, to form an endless quadrilateral path around the quadrilateral guideway. A plurality of planes 7 or 110, are engaged with the quadrilateral guideway for movement around the quadrilateral path. The planes are engaged in such a way that they maintain the same orientation during their entire movement around the path. The planes change their direction of motion by 90° at the angular components, but do not rotate at the angular components. Peripheral seat means in the quadrangular guideway define an endless seat around the guideway for receiving the chain 3 or 104. A plurality of pusher members 4 or 108 are mounted to and spaced along each chain around the guideway. A projection 6 or 111 extends from each plane 7 or 110, into the path of movement of the pusher members so as to be pushed or pulled by the pusher members. This results in movement of the planes along the endless quadrilateral path around the quadrilateral guideway.

I claim:

1. A conveyor for automatically distributing products, comprising:

a quadrilateral guideway having straight components connected to each other by angular components to form an endless quadrilateral path;

a plurality of planes engaged with said guideway for motion around said path while at all times maintaining the same orientation, each plane changing direction by 90° at each angular component without rotation;

peripheral seat means defining an endless seat extending around said quadrilateral path;

a chain having vertical links disposed in said peripheral seat means for movement around said endless seat;

drive means engaged with said chain for driving said chain around said endless seat;

a plurality of pusher members connected to and spaced along said chain, each pusher member rotating about 90° at each angular component and moving around said quadrilateral path; and a projection connected to each of said plurality of planes, each projection projecting into the path of movement of said pusher members so as to be moved by said pusher members around said quadrilateral path.

2. A conveyor according to claim 1 wherein each pusher member comprises a horizontal bar fixed to said chain and a magnetic element connected to each horizontal bar and moveable with movement of said chain around said quadrilateral path.

3. A conveyor according to claim 2 wherein each projection comprises a metallic disk for cooperation with one of said magnetic elements for moving said planes around said quadrilateral path.

4. A conveyor according to claim 1 wherein each projection comprises a vertically extending stirrup extending from a lower surface of one of said planes, each pusher member comprising a moveable plate connected to said chain and a pusher connected to said moveable plate and engageable with a stirrup for movement of said planes around said quadrilateral path.

5. A conveyor according to claim 4 including a pair of vertical pins extending from each moveable plate, said pusher of each moveable plate extending between said pair of vertical pins and forming a spring for contacting and pushing each stirrup.

6. A conveyor according to claim 1 wherein said drive means comprises a dragging pinion rotatably mounted to said quadrilateral guideway and tangentially engaging said chain for moving said chain around said endless seat.

* * * * *